Jan. 12, 1960 J. M. DODWELL 2,920,494
METALLIC V-BELT
Original Filed July 20, 1953 2 Sheets-Sheet 2
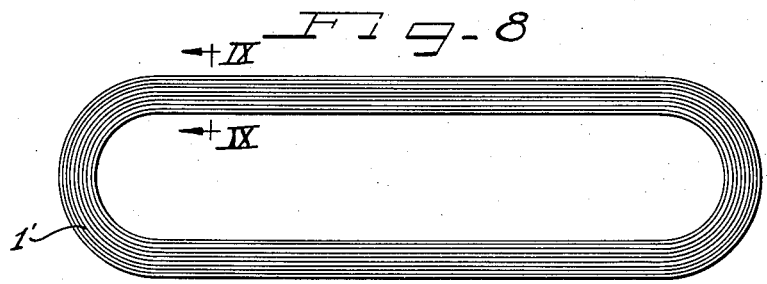
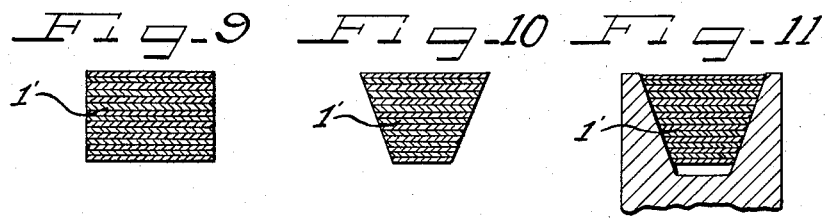
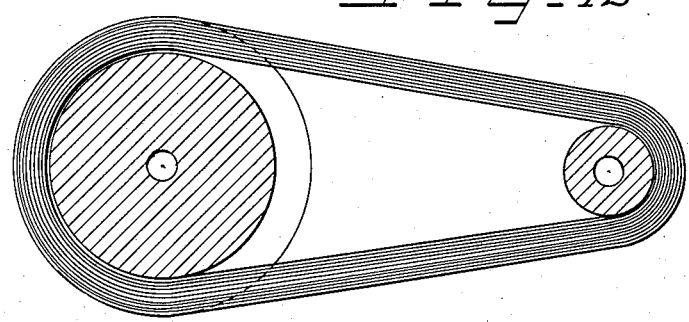
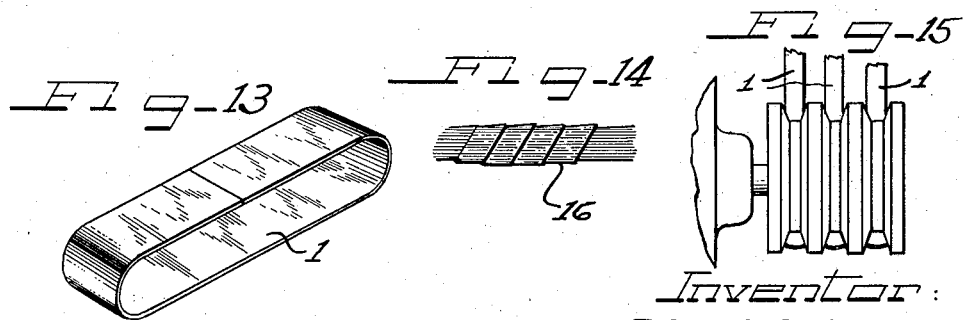
Inventor:
John M. Dodwell
by Hill, Sherman, Meroni, Gross & Simpson Attys United States Patent Office 2,920,494
Patented Jan. 12, 1960

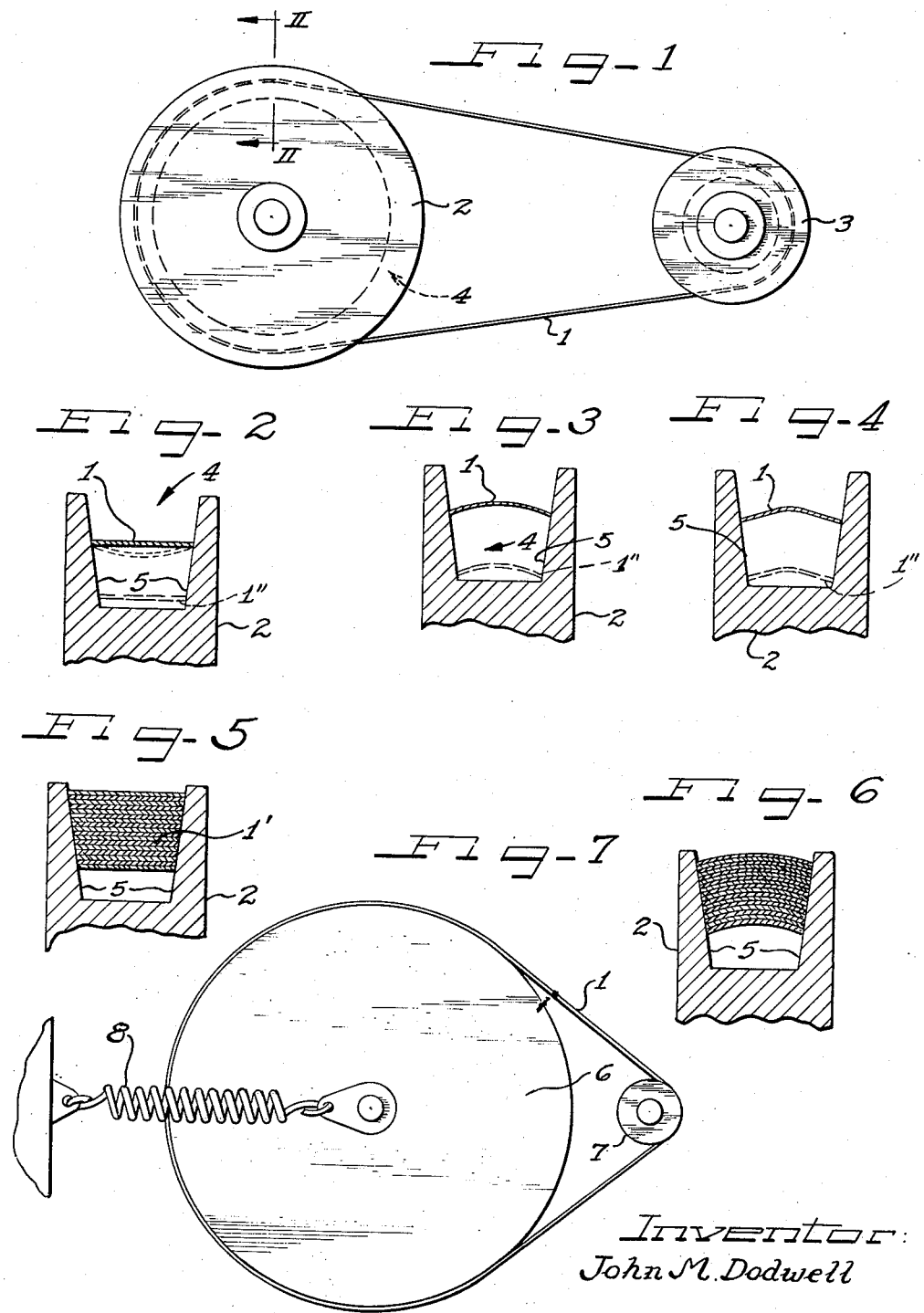

2,920,494
METALLIC V-BELT
John M. Dodwell, Piedmont, Quebec, Canada
Continuation of abandoned application Serial No. 368,999, July 20, 1953. This application February 6, 1957, Serial No. 638,659
20 Claims. (Cl. 74—233)

The present invention relates to a metallic V-belt as well as a method of making the same.

A principal object of the invention is to provide an improved V-belt drive wherein power is transmitted by contact of the edges of a continuous metallic belt with the tapered side walls of the groove of V-type pulleys.

The present application is a continuation of my copending application Serial Number 368,999, filed July 20, 1953 and now abandoned and which application was a continuation-in-part of that of my allowed application Serial No. 634,535, filed December 12, 1945 and which has now become abandoned, and also of my previously copending application Serial No. 224,741, filed May 5, 1951, also now abandoned, and which incorporated the matter of the above mentioned abandoned application Serial Number 634,535.

It has long been recognized in the belt and pulley field that the rubber and fabric, or rubber and steel belts now commonly in use are overly expensive and short lived. While some attempts have been made to utilize metal, particularly such extremely strong metals as steel, for such belts, these attempts have failed. It is felt that such factors as the difficulty in bending steel over pulleys of small diameter for indefinite cycles of flexion and the difficulty in manufacture of endless metal belts of satisfactory flexibility have been important factors in the above noted failure. However, the tremendous economic advantages, stemming both from low initial cost and from greatly improved useful life, have prompted applicant's further investigations and endeavors in this field. It is therefore an object of the present invention to provide a metallic single strand V-belt of sufficient flexibility to be capable of use with small diameter pulleys, which is readily manufactured in endless form, and which has an extremely long useful life.

A further object of the present invention is to provide a novel method of manufacturing metallic V-belts.

Yet another object of the present invention is the provision of a metallic V-belt composed of a single, endless metal band having tapered edges.

Another object of the present invention is the provision of a metallic V-belt composed of a plurality of endless metal bands arranged in laminated but unconnected form.

Still another object of the present invention is the provision of a V-belt comprising a plurality of metallic bands arranged in overlying relation with each of the bands separate and unconnected from the others for unlimited relative sliding movement therebetween.

Yet another feature of this invention is the provision of a metallic V-belt which is precurved so that it will readily conform to the curvature of the pulley groove and so that the internal stresses developed by the belt as it passes around the pulley will be minimized.

Another and yet further object of the present invention is to provide a V-belt comprising a single, endless, metallic band composed of a relatively thin metallic strip.

Another object of the present invention is to provide a V-belt of laminated, endless, unconnected metal bands.

In accordance with the general features of this invention, there is provided a belt drive for use with pulleys each of which has a generally V-type groove defined by side walls inclined at an included angle of up to 25°, said belt comprising an endless, relatively thin band of resilient metal such as stainless steel and having its side edges angled for wedging cooperation with the side walls of the groove.

Still a further feature of the invention relates to making the aforesaid belt of either a single layer, or a plurality of overlying, nested, layers, the construction of the latter being such that when the plurality of belts are used they are held together solely by their simultaneous contact with the pulleys.

Yet another feature of the invention relates to the precurving of the endless band in the process of manufacturing the same so that it will conform readily to the curvature of the pulley drive when it passes around the pulley, thereby minimizing internal stresses in the band as it passes around and conforms to the pulley groove.

Still another feature of the present invention is the provision of an outwardly projecting crown or ridge running along the longitudinal axis of the belt so that the stresses imposed upon the belt upon its passing about the pulleys will be mainly compressive.

Still a further feature of the present invention is the provision of a precurved and outwardly crowned metallic belt which will remain crowned under load and will not become flat upon passing around the pulleys.

A further object of the present invention is the provision of a single strand, flat, metallic V-belt having a crowned outer surface for the elimination of sagging of the belt between the sides of its V-pulley and for the maintenance of a maximum area of contact between the belt and the pulley walls.

Still a further object of the present invention is the provision of a metallic V-belt having an outwardly arched or crowned exterior surface and an inwardly dished inside surface, the radius of the dish being such that a tangent to the arch of the dish at a point of contact with the pulley wall will lie perpendicular to said wall.

Other objects and features of the invention will more fully appear from the following detailed description taken in connection with the accompanying drawings, which illustrate several embodiments thereof, and in which:

Figure 1 is a side view of one form of my V-belt drive utilizing a single metallic band.

Figure 2 is a fragmentary cross-sectional view taken on the line II—II of Figure 1 and showing the belt in the form of a single band, or layer of metal;

Figure 3 is a modification of the belt construction shown in Figure 2 in which the belt has an outwardly projecting ridge or crown of arcuate form;

Figure 4 is a further modification of the construction shown in Figure 2 and shows a further construction in which an outwardly projecting ridge is utilized;

Figure 5 is a fragmentary cross-sectional view similar to Figure 2 but showing an alternative form in which the belt is made up of a plurality of separate layers or bands nested one within the other;

Figure 6 is a modified form of the construction shown in Figure 5 and shows the use of a plurality of metallic bands of the type shown in Figure 3;

Figure 7 is a diagrammatic view of a tensioning and precurving apparatus for imparting an initial precurved or set in the band during the manufacture thereof;

Figure 8 is a side elevational view of a belt constructed in accordance with the present invention and utilizing a plurality of independent, nested layers of metallic bands;

Figure 9 is a cross-sectional view taken along the lines IX—IX of Figure 8, before the side grinding operation has been performed;

Figure 10 is a cross-sectional view taken along the lines IX—IX of Figure 8 after the edges of the belt have been ground to the same slope as the pulley with which the belts are to be used;

Figure 11 is a fragmental sectional view through a portion of a V-pulley showing the V-belt of Figure 10 in position therein;

Figure 12 is a side elevational view of the belt shown in Figure 8 in position on a pair of V-pulleys;

Figure 13 is an isometric view of a single endless band constructed according to one of the methods of the present invention;

Figure 14 is a fragmental view of the belt shown in Figure 8 bound about with tape to retain the unconnected laminations in place for shipment or storage; and Figure 15 is a showing of the use of a plurality of single layer belts in use in a narrow multi-groove pulley.

As shown on the drawings:

Referring to Figures 1 through 4, in which are shown the preferred embodiments of the present invention, the reference numeral 1 indicates generally an endless metallic band or belt embodying the features of my invention. In Figures 1 and 2 the band is shown as comprising strip stock, preferably stainless steel but which also may be any other metal of equivalent physical properties. The belt may be endless or it may have its ends suitably welded together to form an endless loop as shown in Figure 13.

The belt 1 shown in Figures 1 and 2, is trained over spaced V-type pulleys 2 and 3 each of which has its periphery formed with a V-shaped groove indicated generally at 4. Since the belt is made of metal, I have found that excellent results may be obtained with my drive by having the pulleys 2, 3 made of case hardened or otherwise surface hardened steel and by having the inclined groove walls 5 lying at an included angle which is preferably less than 25°, but which may under light-load-per-belt situations lie in the range generally utilized with rubber V-belts of from 25° to 40°. The included angle shown in the Figures 2 through 6 is approximately 15° which has been found to provide particularly satisfactory results, although usable results have been obtained at much lower angles. Operation at angles less than approximately 3½°, while possible, is not desired since below that angle a self holding taper is reached and the belt has a tendency to stick in the groove and to gall the pulley groove walls.

While the belt 1 is shown in Figures 1 and 2 to be positioned almost intermediate in the groove 4, and this position is satisfactory in situations wherein the belt runs relatively free from external disturbances, it has been found that in situations of use where there is likelihood of an object deflecting the belt in any manner, that it is desirable to position the belt near the base of the groove. This is so since the use of small included angles in the V-belt pulley has a tendency to cause the belt to lock with one edge down in the bottom of the pulley groove in cases in which the belt has been deflected by foreign objects, etc.

The tendency to lock depends upon several factors, including thickness of the belt, width of the belt, depth of the pulley groove beneath the belt, and the included angle of the pulley groove. For pulleys having included an angle of less than 25° the problem is rather severe in cases of slightly misaligned pulleys and installations subjected to shocks. Experimentation has shown however, that by reducing the depth of the pulley groove that it becomes impossible for the belt to deflect into the groove to the critical locking angle and the problem disappears. In the case of a belt approximately 5/32 inch wide, .010 inch thick and lying in a groove having an included angle of approximately 15°, it has been found that a space below the belt of less than 1½ times the thickness of the belt provides a non-locking belt and pulley. Such a position is illustrated in the dashed lines of Figures 2, 3 and 4 at 1″.

The diameter of the pulley upon which my belt can be used (that is the minimum diameter) is related to the thickness of the stock of belt. The thinner the belt the smaller the pulley upon which it may be used. Roughly, about .004 inch thickness of material such as stainless, 18.8 steel to every inch of diameter of pulley can be used. If a two inch pulley is used, a belt material thickness of about .008 inch could be used and so on. In other words, this .004 inch thickness of lamination to 1 inch of pulley diameter seems to be consistent with the bending ability of the material over the pulley without undue fatiguing of the material or bending of the material beyond its elastic limits.

Since the belt bends and straightens out many times per second as it runs over the pulleys, it will be appreciated that the belt is subjected to considerable bending stress. I find, however, that if the belt is made of precurved or initially set stock, the material thereof is subjected to far less bending stresses when passing around the pulleys and, in fact, would be subjected more or less to the same conditions to which it is exposed when running normally straight between the puuleys. In other words, I provide the stock of the belt with an initial set or pre-curve in much the same way as a set is given to a clock spring or to a coiled steel tape measure.

To illustrate my idea of precurving, I have diagrammatically shown in Figure 7 a belt 1 after it has been annealed with its ends welded together. It is trained around a large pulley 6 and a smaller pulley 7, the larger pulley 6 being subjected to a spring force applied by the spring 8 tending to separate the pulleys so as to stretch the belt tightly therearound. It is, of course, obvious that any suitable force may be used for biasing the pulleys apart.

To clarify this foregoing, let us assume that the annealed loop 1 is of .010 inch thickness and of ⅜ inch width and that is is placed over a driver 7 of 2 inches in diameter and a driven pulley 6 of 14 inches in diameter; there being a distance between the centers of the pulleys of about 9 inches. Then while the pulleys are rotated, the application of a tension or spring force 8 results in the stretching of the band so that it takes a permanent deformation or set, after a few turns of the pulleys. This set is a deflection in the band somewhere between straight and the curve of the smallest diameter pulley 7.

I have found from experience that after this precurving of the annealed, but welded belt, the belt folds up into a multiple loop similar to the way a long V-belt of rubber can be folded or coiled. It was found that the annealed stock would take and retain the curve imposed on it when run over the pulleys. This precurve or set is found to be tantamount to a "mean" average between the 2 inch diameter small pulley curve and that of a straight belt of infinite radius. After the precurving operation noted above, the stainless loop 1 is tempered to preserve the precurve quality so that when put into service on the pulleys 2 and 3, the band would only be bending in effect only about one-half or one-third the amount that would be true in the case where the loop had not been precurved. As a final step, the sharp corners of the belt may be rounded slightly, if desired, to prevent injury to persons handling the belt.

I have found that commercial stainless steel of the austenitic work-hardening types generally referred to as "18–8" or "17–7" steel are very satisfactory since they are not "dead soft" when annealed and have considerable spring up to the point of permanent distortion. It is noted, that certain other metal alloys such as beryllium copper, nickel alloys and even some special grades of carbon steel will make belts of satisfactory physical characteristics. Due to the rust, however, ordinary carbon steel is satisfactory only in dry climates, unless coated with corrosion resistant material.

While it may be feasible to precurve the band prior to the welding of its ends together, I believe it would be more expensive than precurving and tempering the band after it is formed into an endless loop. Another advantage of precurving is that it permits the use of a thicker band of metal. This is true since the bending stresses set up in the precurved belt are less than would be the case in the non-precurved belt. Thus, it is possible to practically double the thickness of a straight tempered single layer belt thereby increasing greatly the driving capacity of the belt.

My novel belt drive is especially adapted for automotive and industrial applications in general and can be used in most places where a standard V-belt of the rubber type is used. It enables an extremely simple drive many times more powerful than that now possible using a comparable rubber V-belt, and is far cheaper per horsepower. In fact, it has been found in adapting the belt of the present invention to automotive installations that a stainless belt ⅛ inch wide and .010 inch thick running in pulley grooves of 13° to 15° included angle will carry the load equivalent of that carired by the equivalent ½ inch rubber V-belt. While, as noted above, it is possible to utilize flat stainless belts much wider than ⅛ of an inch, it has been found desirable in automotive installations wherein misalignment between pulleys is a common occurrence to narrow the belt to allow lateral flexibility sufficient to accommodate this misalignment.

It has been found further that a belt of ⅛ or ⁵⁄₃₂ of an inch across will very satisfactorily handle a misalignment of .067 inch per 8 inches between pulley centers, a misalignment which is found in at least one of the major automotive products on the market today. Of course, in installations in which no pulley misalignment exists or self-aligning pulleys are to be utilized, the belt may be much wider without causing excessive fatigue stresses due to lateral bending. It is, of course, desirable to reduce pulley misalignment to a minimum since it permits the use of wider, stronger belts.

Use of the narrower belt widths has in some cases reduced the strength of the belt to only slightly greater than the necessary strength, thereby reducing the safety factor to an undesirable point for some installations. The modifications shown in Figures 3 and 4 have greatly increased the safety factor by decreasing the tendency of the flat belt as shown in Figure 2 to become concave at its upper surface thereby placing the inner surface or underneath side of the belt in tension. As shown in Figures 3 and 4, the belt is pre-arched to provide a ridged or crowned outer surface which may comprise a convex or arcuate form as shown in Figure 3, or an angular ridge as shown in Figure 4. This construction places the belt in compression much in the same manner as overhead bridge trusses take compressive loads to support a hanging bridge.

At this point, it is noted that, it is possible to have the underside practically any configuration desired since the load is taken by the outwardly crowned upper surface. Therefore, the undersurface may be generally similar to the outer surface or, on the other hand, it may be flat, or concave about a slightly different radius than that forming the curve of the outer surface to thereby provide a belt slightly thicker in the middle or alternatively one slightly thinner at its middle than at its edges. In any event, the outward curvature of the outer surface is the essential feature and has proved extremely beneficial in preventing the flexing of the belt into a convex form when passing about the pulleys under heavy loads. A further benefit in the outwardly crowned construction lies in the fact that the belt tends to perfectly adapt itself to the angle of the pulley grooves and does not pull away into a position such as that shown in the dotted lines of Fig. 2. This gives a better gripping action, allowing a greater part of the belt to be in contact with the pulleys and thereby reduces the edge biting effect or cutting action which is apt to increase wear under heavy loads.

In the manufacture of the outwardly crowned belt, it is desirable to precurve or set the belt at the time of crowning. It has been found that by wrapping the stock about a roll or pulley of the desired diameter of set during the rolling operation, the crowned belt will upon its completion of the rolling have a set substantially equal to the diameter of the pulley about which it was wrapped. While it may be expected that a crowned belt would tend to flatten out when passing about a rather small diameter pulley, much in the manner familiar to all who have ever used a steel tape measure of the type which has an arcuate configuration when extended, it has been found that precurving of the belt entirely eliminates this tendency when the belt is used with pulleys having generally the same diameter as the precurving roll.

In operation this means that if the band or belt is precurved around a 7 inch roll in its manufacture with an outer crown of .002 of an inch, for example, when this belt is placed about V-pulleys of 7 inch diameter, the crown will remain exactly .002 of an inch. When the belt is used around either smaller or larger diameter pulleys than the 7 inch above noted, the crown will decrease slightly as in the case of the steel tape measure.

In utilizing this phenomena with metallic V-belts particularly adapted for automotive use wherein the smallest pulley in the drive is the 3½ inch diameter generator pulley, I have found it very satisfactory to precurve the crown belt at a diameter intermediate between the standard 3½ inch diameter of the generator pulley and the infinite diameter of a straight line. Under these circumstances the belt will then flatten out slightly when entrained about each of the pulleys. Since this precurving of the crowned belt prevents the belt from flattening out when it passes over the V-pulleys, the belt cross-section is never placed under a tension stress. All of the loads imposed upon the belt due to its contact with the side walls of the V-pulleys are in compression, a factor which greatly reduces fatigue in the belt caused by constantly shifting forces which are found in the regular straight belt.

It should be noted with respect to all of the modifications shown in Figures 1 through 6 that my belt makes it possible to use a pulley groove defined by walls at a considerably lesser angle than the 38° to 40° now commonly used in connection with the rubber V-belt pulley drives. Further, in a drive of my invention when the pulleys are whirled with the belt thereon, the belt rolls without apparent friction losses and as if it were a free anti-friction drive, whereas in the ordinary V-belt drive the belt will not whirl at all unless under a power drive. This is due to the fact that the rubber belt has high internal friction and large radial width both of which features are not found in my belt and which causes the rubber belt to stop dead when the turning torque is removed.

While, as was stated above, I prefer to use a single strand belt 1, it may be desirable under certain conditions to utilize a multiple of nested endless belts as shown in Figures 5, 6 and 11. In these cases the nested laminations are preferably not secured together but are held in position solely by interlocking contact one against the other. The advantage of this construction will more fully appear from a description of the following described embodiment of the invention shown in Figures 5, 6 and 8 through 14. In each of these constructions the bands 1' are made of thin metal of requisite tensile strength and of length that the bands may be assembled in laminated formation as shown in Figure 8 without causing any buckling of adjacent bands.

The method of manufacture of the laminated belts contemplates the steps of providing a plurality of endless bands the appropriate respective lengths, assembling the bands in the laminated form shown in Figure 8, and then grinding the side margins of the assembled laminations to the desired inclined angle while properly restraining them against relative movement. After the belt has been assembled and the side margins ground it is wound with tape 16 as shown in Figure 14 to maintain the laminations in place for shipment or storage. When the belt is to be applied to the V-pulleys, the binding is removed at the time of installation thus making it possible to apply the belt without relative disengagement or displacement of any of its laminations. In this regard it is noted that the belt may actually be placed upon the pulleys in the wrapped state and the wrapping removed before tension is applied. This technique would absolutely obviate any danger of the laminations becoming tangled or separated as the result of poor handling, a factor often found in connection with articles sold to a vast assortment of individuals.

As shown in Figure 6 the crown modification of the belt shown in Figures 3 and 4 may be utilized in the laminated construction equally as well as the belt of the straight or flat type. In fact it will be noted from Figure 6 that the bands will have a tendency to nest together thereby positively preventing lateral relative movement between the individual bands. This feature positively eliminates any tendency of vibration in a lateral direction which might occur in certain applications of the straight laminated belt.

In further connection with the laminated type belt of any of the modifications shown in Figures 5, 6 and 11, it is, of course, apparent that the belts are prevented from relative displacement in a lateral direction during service by reason of the engagement of the edges of the individual bands with the side surfaces of the pulley grooves. The nesting feature provided in the crowned, multiple layer belts shown in Figure 6 will, however, aid in maintaining the belts together in the space between pulleys, especially in installations in which the center to center distances between the pulleys is rather large.

I have learned that for any given V-belt transmission problem a metallic V-belt constructed in accordance with the principles of this invention is only a fraction of the depth of a molded rubber belt, or is in fact much less than ⅓ of the depth of a molded rubber V-belt. To illustrate this point, one band of .010 stainless steel ⅛ or 5/32 inches wide should transmit the same power as that carried by the now standard ⅜ inch wide by ¼ inch deep molded rubber V-belt utilized with motor cars present in production. In situations in which it is desired to maintain a ⅜ inch width, the thickness of .010 inch is maintained as a desirable value when utilized with a 3½ inch generator pulley thus providing a belt which is 1/25 as deep as the rubber belt for which it is substituted.

The belt of the present invention has a greater tensile strength than any of the fabricated belts now on the market, it will wear longer and maintain its length since it does not stretch, and it is able to run satisfactorily in oil and other similar media which are highly injurious to rubber. The stainless steel belt will also, of course, operate satisfactorily in temperatures far above those which would destroy a rubber belt. Further, the metallic belt of my invention has a very low factor of internal friction which feature cuts down on power losses and is less destructive to the belt itself thus greatly lengthening its life.

In view of the tremendous strength and relatively narrow width of the single layer metal belts herein disclosed, it is possible to utilize a plurality of them in side by side position in a narrow multi-groove pulley. Such an arrangement is shown in Figure 15. Due to the reduced width of the belts, such a multi-belt pulley can be very much narrower than those now in use with rubber belts and hence space requirements may be reduced without any loss in power transmission. This reduction in pulley width also greatly reduces bearing wear on motor shafts since the overhang of the motor shaft is minimized.

While I have shown several modifications of the laminated type belt, and this construction has proved highly valuable in certain installations, it is to be understood that my preferred embodiments are those in which a single layer belt is utilized. It will be readily apparent to those skilled in the art that the construction of a single strand steel V-belt which will carry the same loads now carried by molded rubber V-belts which have several serious defects, among which is short life, will greatly reduce the cost of and increase the area of available use and utility of V-belt drives. Since the stainless steel belts of my invention are practically indestructible, and the wear upon them when used in conjunction with hardened pulleys is almost negligible, the maintenance cost of these belts is extremely small and far superior to any of the molded rubber belts now on the market.

As has been noted above, one method of manufacturing the belts of the present invention is to butt weld a strip of metal to provide a loop. This method is accepted in cases of readily welded materials such as the martensitic grades of stainless steel but is expensive when hard-to-weld materials are utilized. Further, special heat treatment must be provided to increase the strength of the weld. As an alternative, therefore, the method of endless rolling is preferred.

Endless rolling is advantageous for several reasons. In the first place, work hardening materials such as austenitic grades of stainless steel, such as 18–8, are automatically work-hardened as the rolling progresses. In the second place, no weld or special heat treatment are required and in the third place, belts having a pre-crowned and/or precurved characteristic may be given these characteristics during the rolling. Thus, the endless rolling provide substantially a one-step process aside from the usual "stress relieving" heating at approximately 950° given after rolling.

In the process of endless rolling, a thin section of seamless tubing is placed endwise over a roll having a diameter less than the inside diameter of the tubing. A second roll is moved into contact with the tubing and the tubing is rolled into an increasingly large loop. The rolls are shaped to provide side flanges which limit the width of the loop and in the case of the crowned belt, the rolls are provided with an arcuate contour on the axial direction to thereby automatically place a corresponding curve in the cross-section of the belt.

Pre-curving for reduction of bending stresses is accomplished by guiding, by a pulley or guides, the loop through the rolls in a direction which lies at an acute angle to the centerline between the rolls. By adjusting the angle, the amount of pre-curving may be varied, with the pre-curve diameter decreasing with a decrease in the angle and reaching a minimum determined by the diameter of the mill rolls.

It will be understood that modifications and variations may be effected without departing from the scope of the novel concepts of the present invention.

I claim as my invention:

1. A metallic V-belt for transmitting power from one peripherally grooved V-pulley to another comprising a plurality of relatively thin superposed endless flexible metal bands each of substantially constant width in full peripheral surface contact to form a laminated V-belt structure in which the laminae are entirely disconnected for separate flexing movement, the peripheral edges of each band being tapered so that the entire belt has a uniform V-shaped cross-sectional configuration for fitting the groove of a V-pulley with each band transmitting power independently of the superimposed remaining bands when in use, and the belt being wedged into the groove of said pulley to transmit power through said peripheral edges in contact therewith.

2. In combination with the pulleys of a V-pulley drive mechanism, a V-belt composed of a plurality of laminations of disconnected, endless, thin relatively slidable metal bands arranged in laminated formation in the grooves of the pulleys, the laminations being superimposed with their lateral edges generally aligned to form a belt of substantially V-shaped cross-sectional configuration and the engagement of the aligned lateral edges of the several laminations with the inclined walls of the pulley grooves preventing accidental displacement of a lamination with respect to any other lamination and also transmitting power by reason of the wedged engagement of said edges and said walls under a rotational load imposed on said pulleys.

3. In combination, grooved drive and driven pulleys for a belt drive, each having a generally V-type groove defined by diverging side walls, and an endless belt consisting of an individual thin flexible one-piece band of sheet metal of substantially constant width having its side edges wedged into power transmission contact with said side walls of said grooves.

4. In combination, grooved drive and driven pulleys for a belt drive, each having a generally V-type groove defined by diverging side walls and an endless belt which consists of a thin one-piece band of flexible sheet metal of substantially constant width such as stainless steel and having its side edges wedged into power transmission contact with said side walls of said grooves, said belt being precurved along its length to provide a neutral unstressed condition of the belt in which the belt is curved on a radius intermediate between the radius of the smallest of said pulleys and a straight line so as to minimize internal stress in the stock of the band as it passes around and conforms to the pulley grooves and then straightens out in passing on to the next pulley.

5. In combination, grooved drive and driven pulleys for a belt drive, each having a generally V-type groove defined by radially diverging side walls, and a plurality of completely separate thin nested endless bands of flexible sheet metal each of substantially constant width having their side edges tapered to conform to the inclination of said side walls of the grooves and for power transmission wedging contact therewith.

6. In combination, grooved drive and driven pulleys for a belt drive, each having a generally V-type groove, and a plurality of completely separate thin nested endless bands of flexible sheet metal each of substantially constant width having their side edges tapered to conform to the inclination of said side walls of the grooves and for power transmission wedging contact therewith, each of said bands being precurved along its length to provide a neutral unstressed condition of the belt in which the belt is curved longitudinally on a radius intermediate between the radius of the smallest of said pulleys and a straight line so as to minimize internal stress in the stock of the band as it passes around and conforms to the pulley groove.

7. In a belt construction for use as a drive between grooved pulleys each of which has a generally V-type groove defined by inclined side walls, a plurality of nested flexible bands of stainless steel each of substantially constant width completely separated from each other except for frictional contact between the bands and having their side edges tapered to conform to the inclination of the side walls of the pulley grooves and for power transmission wedging contact therewith.

8. In a belt construction for use as a drive between grooved pulleys each of which has a generally V-type groove defined by inclined side walls, a plurality of nested flexible bands of metal each of substantially constant width completely independent from each other except for frictional contact and having their side edges tapered to conform to the inclination of the side walls of the pulley grooves, each of said bands comprising a relatively thin strip having a longitudinally extending outwardly crowned outer surface and a dished inner surface generally parallel to said outer surface.

9. In a metallic V-belt, an endless one-piece loop of thin sheet metal forming a flexible band of essentially constant width throughout its length and having the edges thereof adapted for engagement with the tapered walls of V-pulleys.

10. In combination, drive and driven pulleys for a belt drive, each having a generally V-type groove defined by side walls which are inclined toward each other from the outer side of the groove to the bottom thereof, and an endless belt which is a relatively thin one-piece band of flexible sheet metal of substantially constant width and having its side edges tapered to wedge into power transmission contact with the side walls of said groove, said pulley grooves having a width at the base only slightly less than the width of said belt, whereby said belt is positioned in use only slightly removed from said base to provide an automatic unlocking action.

11. In a belt for use as a drive between pulleys of a relatively small diameter, a single flexible one-piece metal band of substantially constant width and of much greater width than thickness, said belt having a longitudinally extending pre-curve therein in the direction of its bend when around one of said pulleys and substantially away from a straight rectilinear form so that internal stresses in said metal belt are minimized in its operation over said pulleys.

12. In combination, grooved drive and driven pulleys for a belt drive, each having a generally V-type groove defined by side walls which are progressively inclined toward each other from the outer side of the groove to the bottom thereof, and an endless belt which is a relatively thin one-piece band of flexible sheet metal of substantially constant width and having a width greater than the width of the bottom of said groove whereby the side edges of the band wedge into power transmission contact with the side walls of said grooves.

13. In combination, grooved drive and driven pulleys for a belt drive, each having a generally V-type groove defined by side walls each of which is progressively inclined toward each other from the outer side of the groove to the bottom thereof, and an endless belt which consists of a relatively thin one-piece band of flexible sheet metal of substantially constant width and having its side edges tapered to wedge into power transmission contact with the side walls of said grooves.

14. In combination, grooved drive and driven pulleys for a belt drive, each having a generally V-type groove defined by side walls each of which is progressively inclined toward each other from the outer side of the groove to the bottom thereof, and an endless belt which consists of a relatively thin one-piece band of flexible sheet metal of substantially constant width and having its side edges wedged into power transmission contact with the side walls of said grooves, said band being precurved to a substantially constant initial longitudinal arc or set along its length, the precurve providing a pre-set in the belt in the direction of its bend when around the pulleys and which is substantially curved away from a straight rectilinear form so as to conform more readily to the curvature of the pulleys with less internal stress as the belt, during driving, moves from straight through the neutral or precurved condition to the condition of extreme curvature when passing about a pulley.

15. In combination, grooved drive and driven pulleys for a V-belt lrive, each having a generally V-type groove defined by side walls which are inclined toward each other from the outer edge of the groove to the bottom thereof, and an endless belt which consists of a thin one-piece band of flexible metal of substantially constant width and having an outwardly directed crown extending along the longitudinal axis of the band whereby contact of the side edges of the band with the grooves of the pulleys will cause exclusively compressive loads to be placed on the belt due to its being drawn radially inwardly of the pulley by the driving torque.

16. In combination, grooved drive and driven pulleys for a belt drive, each having a generally V-type groove defined by side walls which diverge from one another and an endless metal belt which consists of a relatively thin one-piece band of substantially constant width having a longitudinally extending outwardly directed crowned surface and having its side edges wedged into power transmission contact with the side walls of said grooves.

17. In a belt for use as a drive between V-pulleys, a single one-piece metal band of substantially constant width and of substantially greater width than thickness and having an outwardly directed crown extending along the longitudinal axis thereof, said belt having an initial precurve to a substantially constant initial longitudinal arc or set therein along the length thereof providing a neutral unstressed condition of the belt wherein the belt will tend to form a coil having a diameter greater than the smallest of said pulleys and a periphery substantially less than straight so that the said crown will not flatten out when the belt is passed over its associated pulleys.

18. In a V-belt, a single endless one-piece strip of thin metal, said belt having an outwardly projecting crown extending along its longitudinal axis, beveled edges on said belt for cooperation with V-pulleys having grooves and said belt further having an initial substantial precurve therein along the length thereof with a constant precurve radius in the direction of bend around the pulleys of a dimension larger than the radius of the smallest of said pulleys for reducing the stresses set up by bending the metal band from a straight line condition to the curve of the V-pulleys.

19. In a metallic V-belt for use with a V-type groove drive and driven pulleys, an endless one-piece loop of thin sheet metal forming a flexible band of essentially constant width throughout its length, said band being imperforate and having its edges adapted for the engagement with the tapered side walls of said V-pulleys.

20. In combination, grooved drive and driven pulleys for a V-belt drive, each having a generally V-type groove defined by side walls which are progressively inclined toward each other from the outer side of the groove to the bottom thereof, and an endless belt which comprises a relatively thin one-piece band of flexible imperforate sheet metal of substantially constant width and having a width greater than the width of the bottom of said groove whereby the side edges of the band wedge into power transmission contact with the side walls of said grooves.

References Cited in the file of this patent

UNITED STATES PATENTS

| | | |
|---|---|---|
| 1,140,890 | Eloesser | May 25, 1915 |
| 1,309,245 | Coryell | July 8, 1919 |
| 2,194,833 | Nassimbene | Mar. 26, 1940 |
| 2,551,578 | Bendall | May 8, 1951 |